(12) United States Patent
Cox

(10) Patent No.: US 7,721,124 B2
(45) Date of Patent: May 18, 2010

(54) SYSTEM AND METHOD FOR SIGNALING A FIRST DEVICE FROM A SECOND DEVICE

(75) Inventor: Keith A. Cox, Campbell, CA (US)

(73) Assignee: Apple Inc., Cupertino, CA (US)

( * ) Notice: Subject to any disclaimer, the term of this patent is extended or adjusted under 35 U.S.C. 154(b) by 919 days.

(21) Appl. No.: 11/429,717

(22) Filed: May 8, 2006

(65) Prior Publication Data

US 2006/0206736 A1  Sep. 14, 2006

Related U.S. Application Data

(63) Continuation of application No. 10/202,951, filed on Jul. 24, 2002, now Pat. No. 7,069,454.

(51) Int. Cl.
*G06F 1/26* (2006.01)

(52) U.S. Cl. ........................ 713/310; 713/300

(58) Field of Classification Search .......... 713/300–340
See application file for complete search history.

(56) References Cited

U.S. PATENT DOCUMENTS

| | | | |
|---|---|---|---|
| 5,115,450 A * | 5/1992 | Arcuri | 375/219 |
| 5,608,877 A | 3/1997 | Sung et al. | |
| 5,717,957 A | 2/1998 | Lin | |
| 5,787,299 A | 7/1998 | Ostler et al. | |
| 5,794,014 A | 8/1998 | Shetty et al. | |
| 5,842,027 A | 11/1998 | Oprescu et al. | |
| 5,884,086 A | 3/1999 | Amoni et al. | |
| 5,964,850 A | 10/1999 | Castell et al. | |
| 6,134,607 A | 10/2000 | Frink | |
| 6,191,995 B1 | 2/2001 | Huber et al. | |
| 6,232,678 B1 | 5/2001 | Murata | |
| 6,240,520 B1 | 5/2001 | Cha | |
| 6,269,288 B1 | 7/2001 | Smith | |
| 6,311,245 B1 | 10/2001 | Klein | |
| 6,439,916 B1 | 8/2002 | Kuo | |
| 6,483,183 B1 | 11/2002 | Fink et al. | |
| 6,483,444 B2 | 11/2002 | Hoffman et al. | |
| 6,532,500 B1 | 3/2003 | Li et al. | |
| 6,586,849 B2 | 7/2003 | Tarr | |
| 6,734,579 B1 | 5/2004 | Cox | |
| 7,000,127 B2 * | 2/2006 | D'Alessio | 713/320 |
| 7,069,454 B1 * | 6/2006 | Cox | 713/310 |
| 7,162,672 B2 * | 1/2007 | Werner et al. | 714/724 |
| 2002/0083359 A1 * | 6/2002 | Dow | 713/500 |
| 2002/0149352 A1 | 10/2002 | Ling | |
| 2003/0093607 A1 | 5/2003 | Main et al. | |

OTHER PUBLICATIONS

Dallas Semiconductor, Fundamentals of RS-232 Serial Communications, Application Note 83, Mar. 9, 2008, pp. 1-9, from www.web-ee.com/primers/files/app83.pdf.

Nichols et al., Data Communications for Microprocessors, McGraw-Hill, 1982, pp. 57-144.

* cited by examiner

*Primary Examiner*—Dennis M Butler
(74) *Attorney, Agent, or Firm*—Morrison & Foerster LLP

(57) ABSTRACT

A signaling circuit may be implemented with a connection comprised of signal lines having predefined signals and/or functions. The predefined signals and/or functions may be defined by an individual entity or standards organization. The signaling circuit transmits information in addition to the predefined signals and/or functions. The information may be transmitted from a second device, such as a visual display screen, to a first device, such as a computing device, using at least one signal line in the connection. The information may include information about the state or status of the second device.

16 Claims, 9 Drawing Sheets

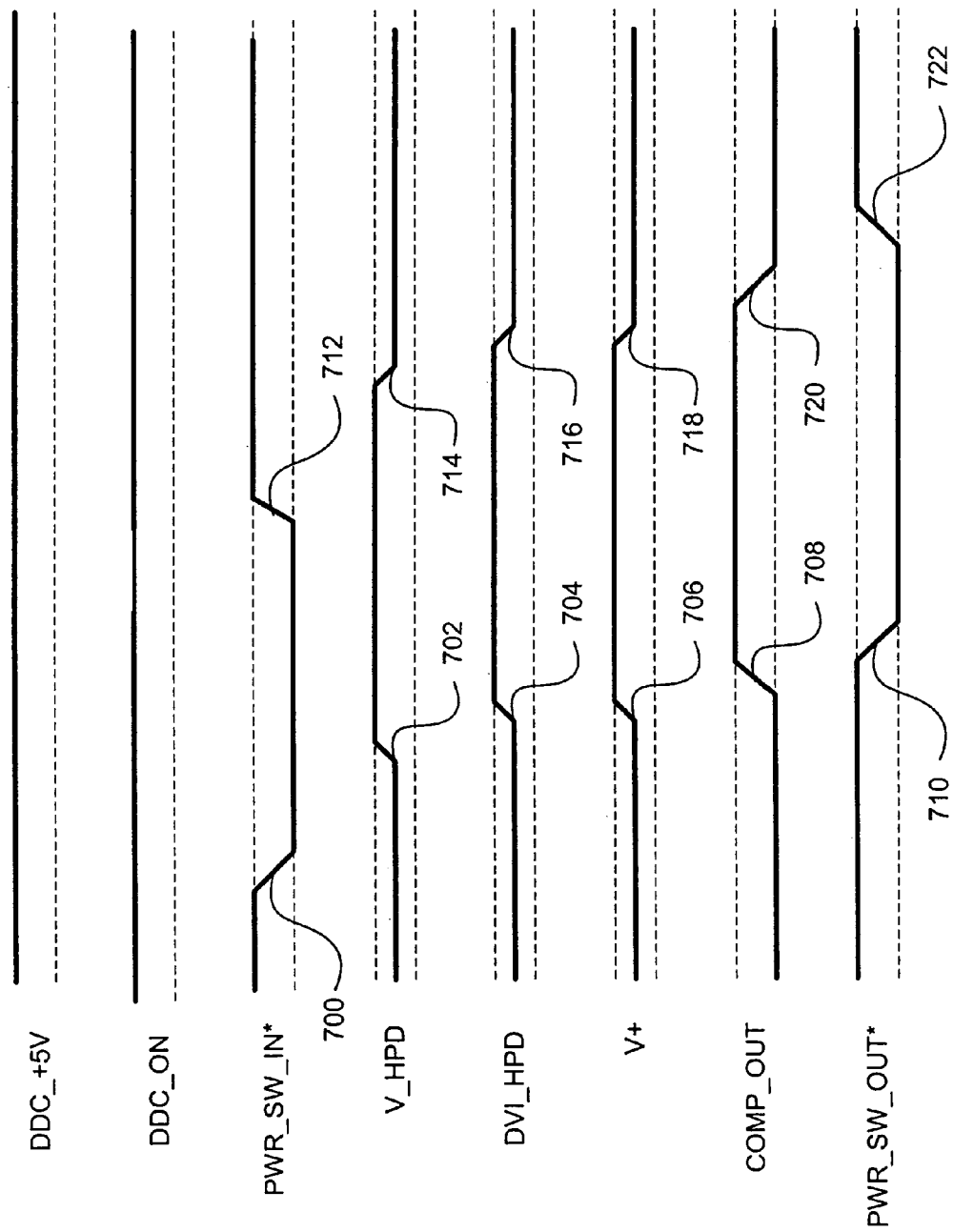

SYSTEM AND METHOD FOR SIGNALING A FIRST DEVICE FROM A SECOND DEVICE

CROSS-REFERENCE TO RELATED APPLICATIONS

This application is a continuation application of prior application Ser. No. 10/202,951, filed Jul. 24, 2002 now U.S. Pat. No. 7,069,454.

BACKGROUND

Modern electronic devices, such as computing systems, strive to offer a variety of features to users. Some of these features are standard features known and used in a particular industry, while others are unique and differentiate a particular product or manufacturer from its competitors. One example of a feature that is offered in some computing systems is the ability to turn off, or place in a reduced power state, a first device from a second device. For example, turning off a display screen may also turn off a computing device, such as a laptop or desktop computer, connected to that display screen.

Another feature that may be offered in some computing systems is the ability to have multiple display screens connected to a computing device. The display screens may be connected to the computing device using one or more connection techniques. For example, the connection means may be unique to a manufacturer. Other connection techniques may include connectors or ports having predefined functions. The predefined functions may be defined by an individual manufacturer or designer, or by a standards organization. A government, administrative department, technical, or industry group are examples of standards organizations that may define the functions and/or signals that create a particular standard.

One limitation with using a connection comprised of signals having predefined functions is that additional features not defined in the standard may be lost. A manufacturer may not be able to implement any additional features since there may not be any free, or unused, signal lines available in the connection. Thus, features that a user may expect with a particular product and/or manufacturer may be lost when a system uses a connection technique having predefined functions.

SUMMARY

A signaling circuit may be implemented with a connection comprised of signal lines having predefined functions. The predefined functions may be defined by an individual manufacturer or designer, or by a standards organization. The signaling circuit transmits information in addition to the predefined functions. The information may be transmitted from a second device, such as a visual display screen, to a first device, such as a computing device, using at least one signal line in the connection. The information may include information about the state or status of the second device.

In an exemplary embodiment of the present invention, the signaling circuit may place the first device in a reduced power state when a switch associated with the second device is asserted. The signaling circuit may generate a signal transition on one or more signal lines having a range of signal values for a particular output state. For example, a high output state may be defined to be within a range of 2.4 volts to 5.5 volts. This range may be subdivided in order to signal the first device.

In an exemplary embodiment of the present invention, a voltage level at or near 3 volts may indicate the signal line is to be used for its predefined function only, while a voltage level at or near 5 volts may transmit information about the state of the switch in addition to the predefined function. Thus, the signaling circuit may utilize the one or more signal lines for their predefined functions and, at the same time, transmit information to the first device.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 7 is a timing diagram for certain signals in the exemplary signaling circuit of FIG. 6.

DETAILED DESCRIPTION

To facilitate an understanding of the present invention, it is described hereinafter in the context of a specific embodiment. In particular, reference is made to the implementation of the invention in a computing system utilizing a connection or port having predefined signals and/or functions. The computing system includes a computing device connected to a visual display screen through a Digital Visual Interface (DVI) connection or port. It will be appreciated, however, that the practical applications of the invention are not limited to this particular embodiment. Rather, the invention can be employed to signal other information in other types of electronic devices and systems, including, but not limited to, broadcast systems, network structures, and electronic devices that utilize one or more connections or ports having signal lines with predefined functions.

Figure 1:
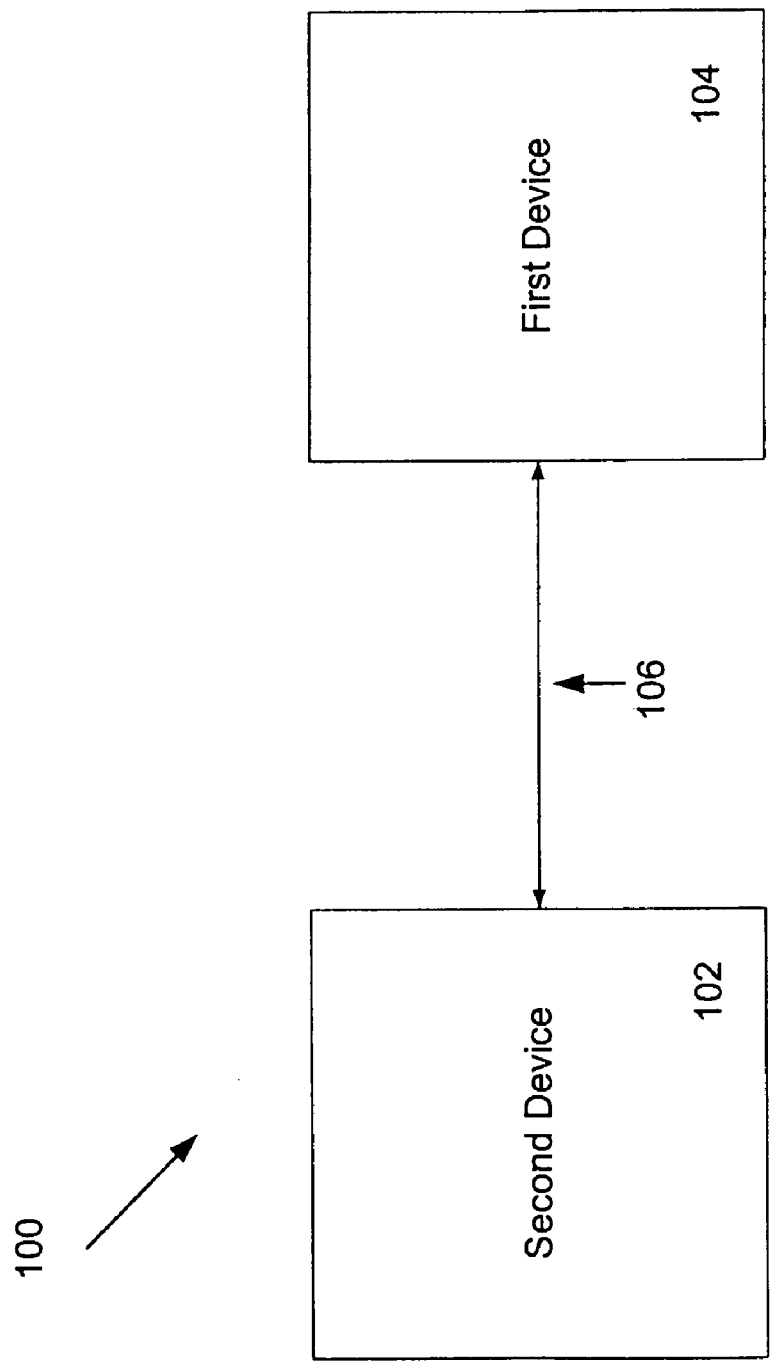
FIG. 1 is a block diagram illustrating a first embodiment of a system that may be used to implement the present invention.

With reference now to the figures and in particular with reference to FIG. 1, a block diagram illustrates a first embodiment of a system that may be used to implement the present invention. System 100 may include, but is not limited to, a second device 102 electronically connected to a first device 104 via connection 106. In an exemplary embodiment, the second device may be implemented as a visual display screen and the first device may be implemented as a computing device. Connection 106 may include signal lines having predefined signals and/or functions. The predefined signals and/or functions may be defined by an individual manufacturer or designer, or by a standards organization. In this exemplary embodiment, connection 106 may be implemented as a Digital Visual Interface (DVI) connection. In alternate embodiments, system 100 may be implemented using various components and configurations in addition to, or instead of, those discussed in conjunction with the FIG. 1 embodiment.

Figure 2:
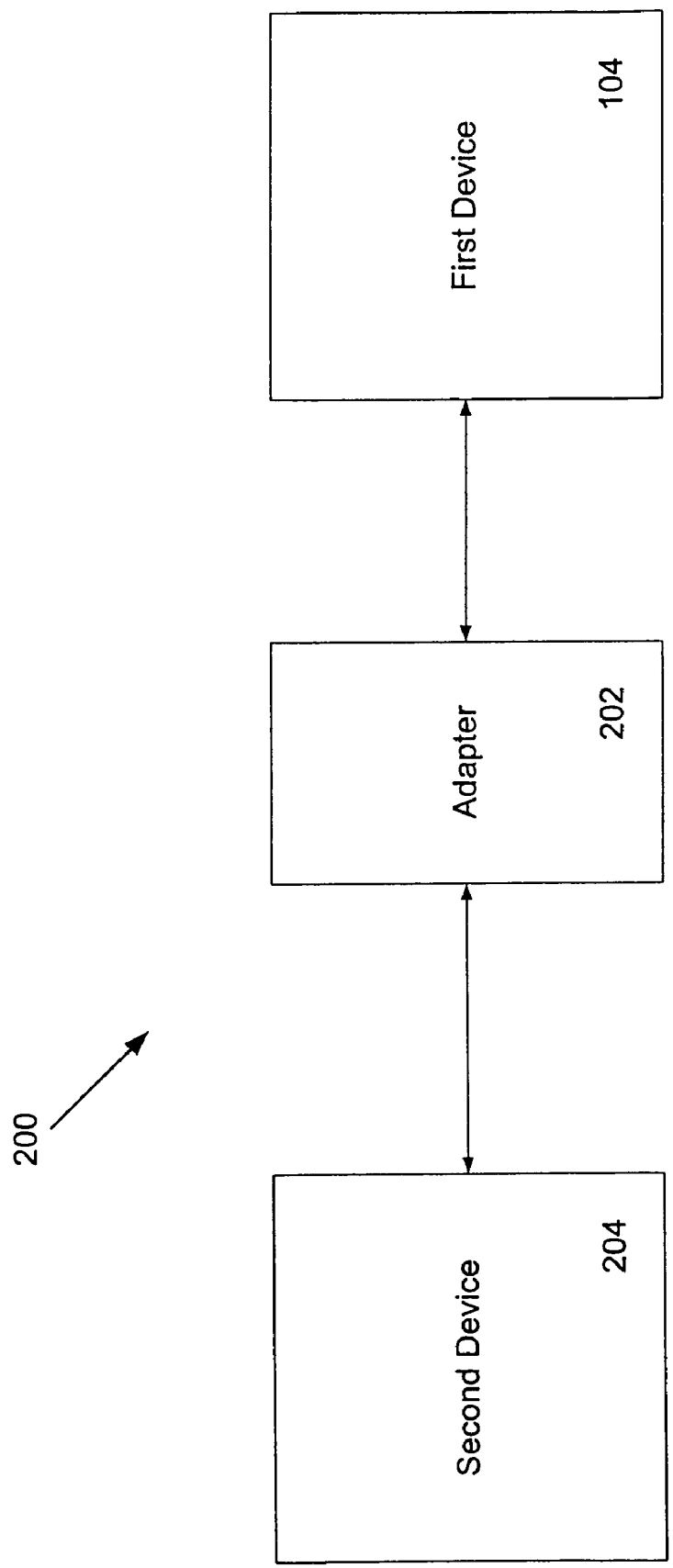
FIG. 2 is a block diagram depicting a second embodiment of a system that may be used to implement the present invention.

FIG. 2 is a block diagram depicting a second embodiment of a system that may be used to implement the present invention. System 200 may include, but is not limited to, an adapter 202 electronically connected to a second device 204 and to a first device 104. In the FIG. 2 embodiment, the second device may be implemented as a visual display screen and the first device may be implemented as a computing device. In alternate embodiments, system 200 may be implemented using various components and configurations in addition to, or instead of, those discussed in conjunction with the FIG. 2 embodiment.

Figure 3A:
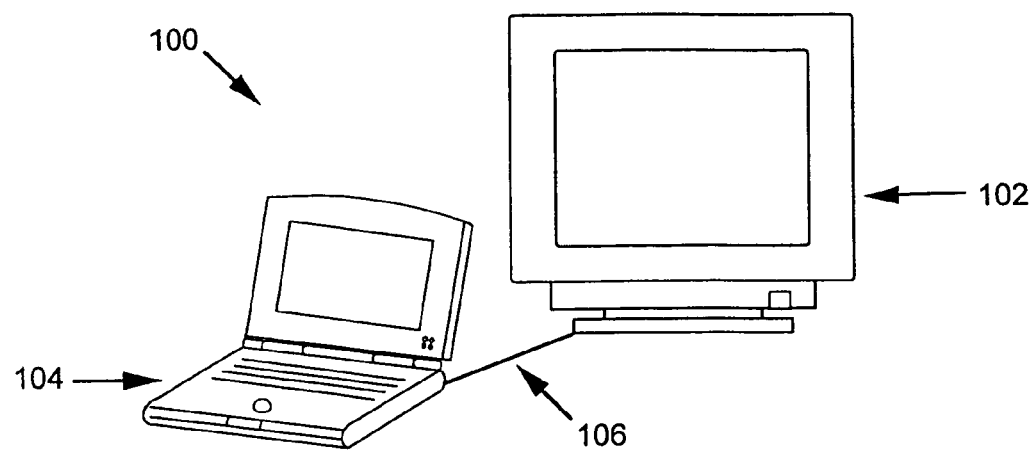
FIG. 3a illustrates an exemplary system as shown in FIG. 1.

Referring now to FIG. 3*a*, an exemplary system from FIG. 1 is shown. System 100 may include, but is not limited to, a visual display screen 102 electronically connected to a computing device 104 via connection 106. Visual display screen 102 may be implemented as a digital display, such as a Liquid Crystal Display (LCD) or plasma display. Alternatively, visual display screen 102 may be implemented as an analog display, such as a cathode-ray-tube (CRT) display. Computing device 104 may be implemented as a portable or desktop computer. And connection 106 may be implemented as a Digital Visual Interface (DVI) connection. In alternate embodiments, system 100 may be implemented using various components and configurations in addition to, or instead of, those discussed in conjunction with the FIG. 3*a* embodiment.

Figure 3B:
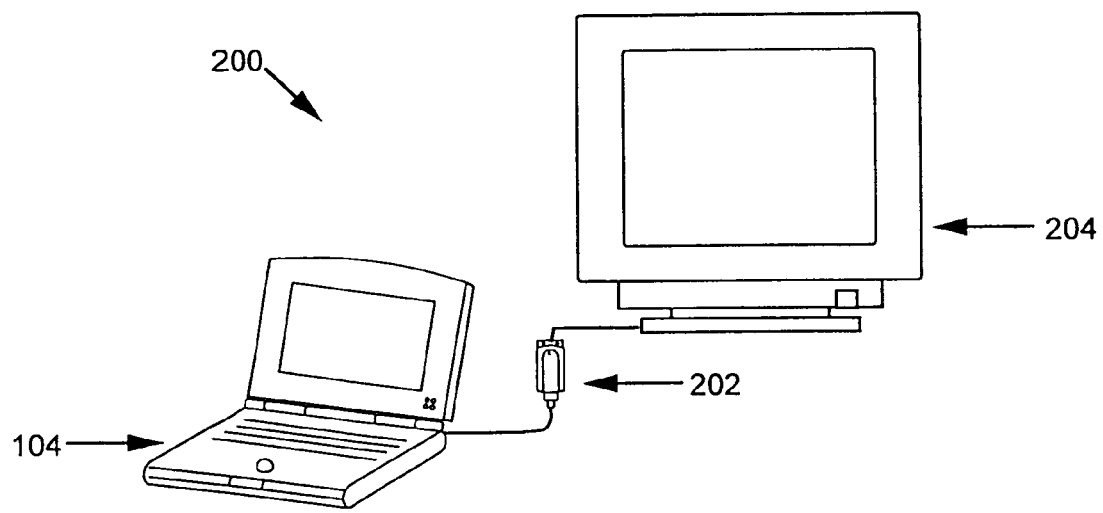
FIG. 3b depicts an exemplary system 200 as shown in FIG. 2.

FIG. 3*b* depicts an exemplary system 200 as shown in FIG. 2. System 200 may include, but is not limited to, an adapter 202 electronically connected to a visual display screen 204 and to a computing device 104. Visual display screen 204 may be implemented as a digital or analog display screen. Computing device 104 may be implemented as a portable or desktop computer. Adapter 202 may be implemented as a DVI adapter, such as the DVI to ADC Adapter sold by Apple Computer®. In alternate embodiments, system 200 may be implemented using various components and configurations in addition to, or instead of, those discussed in conjunction with the FIG. 3*b* embodiment.

Figure 4:
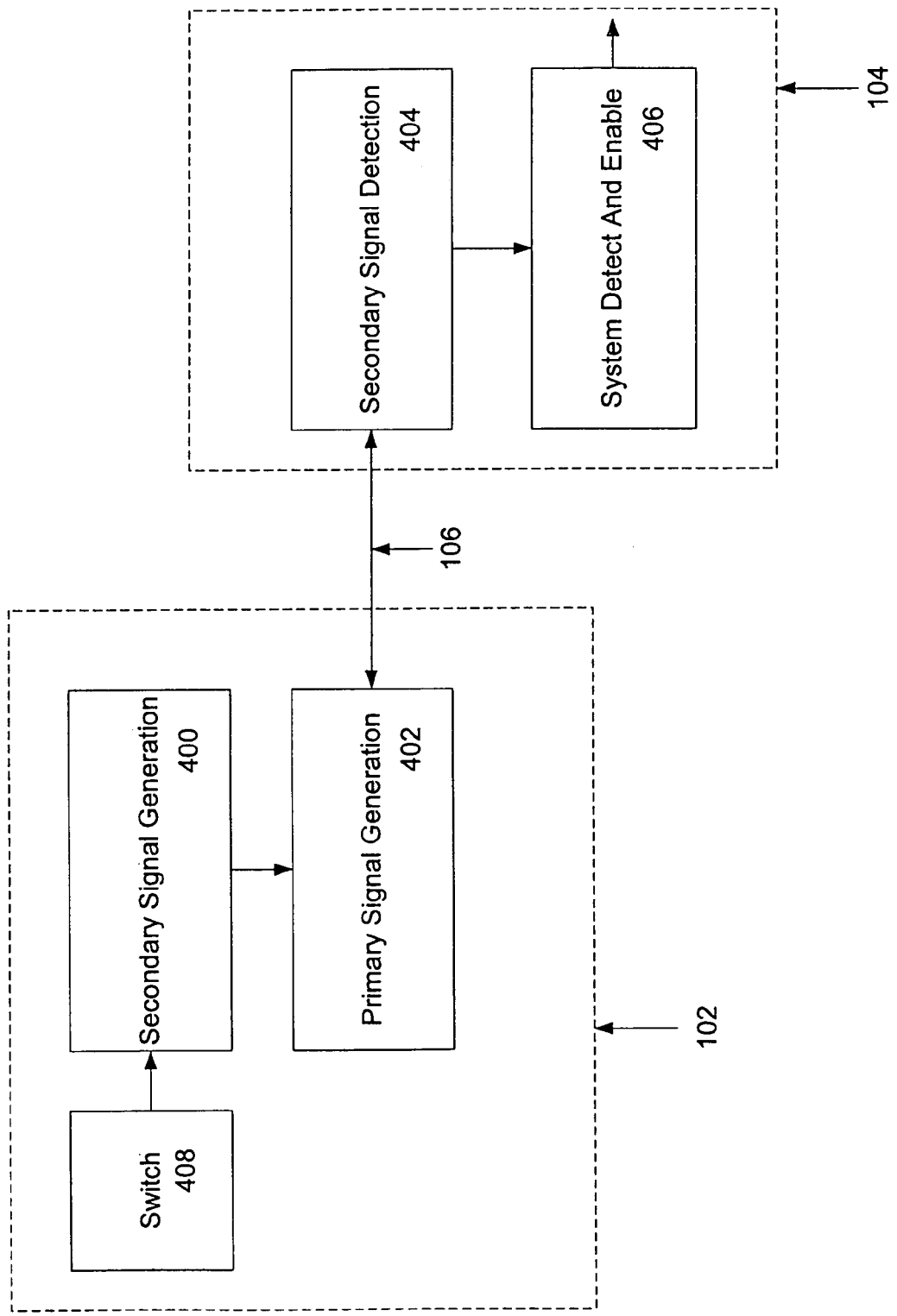
FIG. 4 is a block diagram illustrating an exemplary signaling circuit according to the present invention.

Referring now to FIG. 4, a block diagram illustrates an exemplary signaling circuit according to the present invention. Second device 102 may include, but is not limited to, a secondary signal generation 400, a primary signal generation 402, and a switch 408. First device 104 may include, but is not limited to, a secondary signal detection 404 and a system detect and enable 406. In alternate embodiments, first and second devices may be implemented using various components and configurations in addition to, or instead of, those discussed in conjunction with the FIG. 4 embodiment.

In this exemplary embodiment, secondary signal generation 400 may perform similarly to that of a two-state power supply, in that second signal generation 400 may generate two signal levels. A first signal level may be generated when the signal lines in connection 106 are being used for their predefined functions only. A second signal level may be generated when at least one signal line is used for signaling first device 104. In the FIG. 4 embodiment, the second signal level may be generated in order to deactivate first device 104.

Secondary signal generation 400 may generate or alter a signal when switch 408 is depressed or asserted. In this exemplary embodiment, switch 408 may be pressed or asserted in order to deactivate first device 104. The second device 102 may or may not respond to the assertion of switch 408. In this exemplary embodiment, asserting switch 408 may also deactivate second device 102. The term "deactivate" is defined herein as a reduced power state, including, but not limited to, a sleep state and an off (i.e., no power) state. At least one predefined signal line in connection 106 may then be utilized to transmit this information to first device 104 in order to deactivate first device 104.

Secondary signal detection 404 may be used to detect the different signal levels generated by secondary signal generation 400. When a signal level indicates switch 408 has been asserted, secondary signal detection 404 generates a signal that may cause system detect and enable 406 to initiate deactivation of first device 104. System detect and enable 406 may also be used to detect the presence of secondary signal generation 400. If secondary signal generation 400 is not present in the system, the system detect and enable 406 may then disable secondary signal detection 404.

Figure 5:
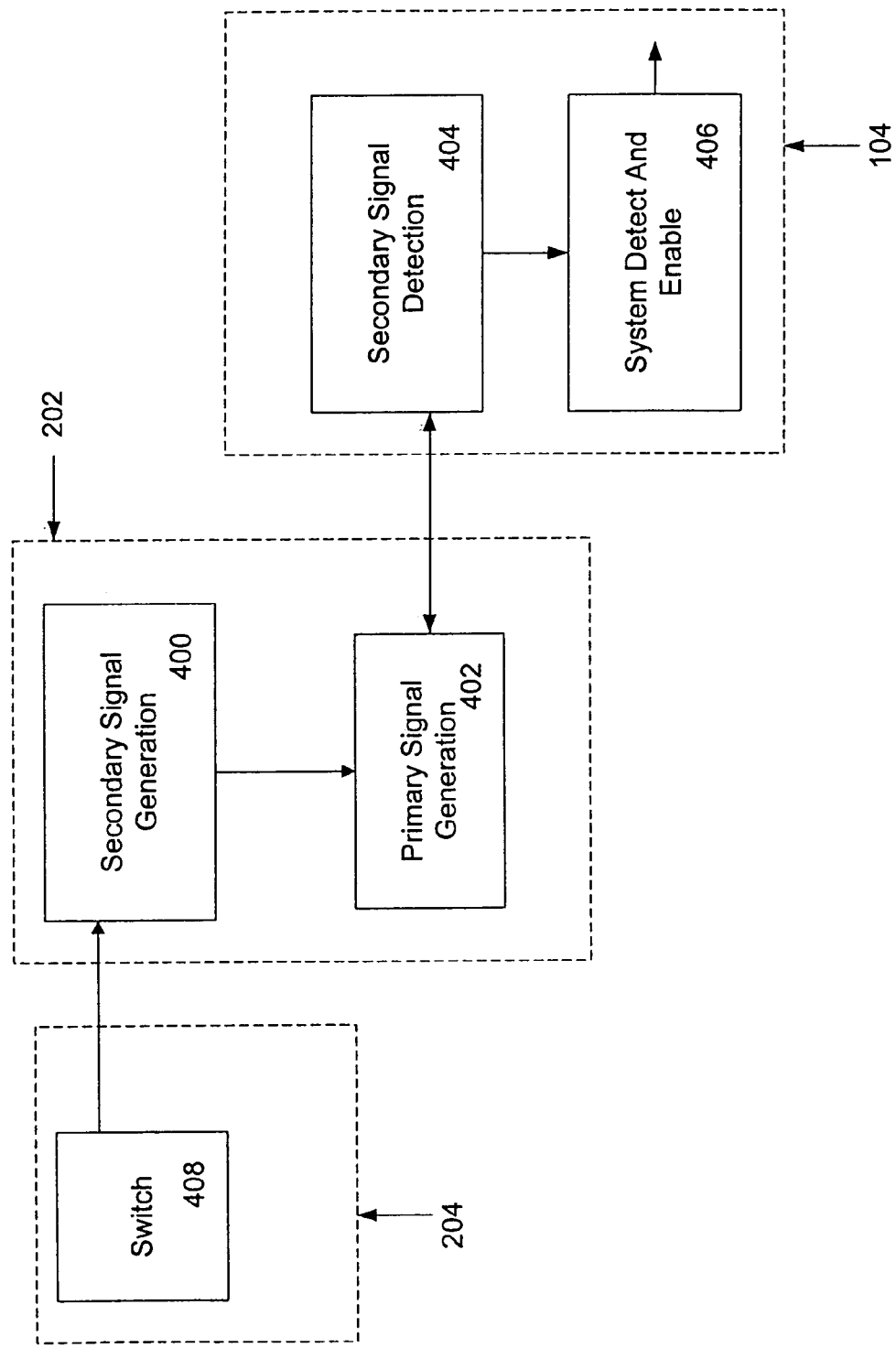
FIG. 5 is a block diagram depicting an alternate exemplary signaling circuit according to the present invention.

FIG. 5 is a block diagram depicting an alternate exemplary signaling circuit according to the present invention. Adapter 202 may include, but is not limited to, secondary signal generation 400 and primary signal generation 402. Second device 204 may include, but is not limited to, switch 408. And first device 104 may include, but is not limited to, secondary signal detection 404 and system detect and enable 406. The various components in adapter 202, second device 204, and first device 104, may operate in a manner similar to the components described with reference to FIG. 4. However, in alternate embodiments, adapter, first device, and second device may be implemented using various components and configurations in addition to, or instead of, those discussed in conjunction with the FIG. 5 embodiment.

Figure 6A:
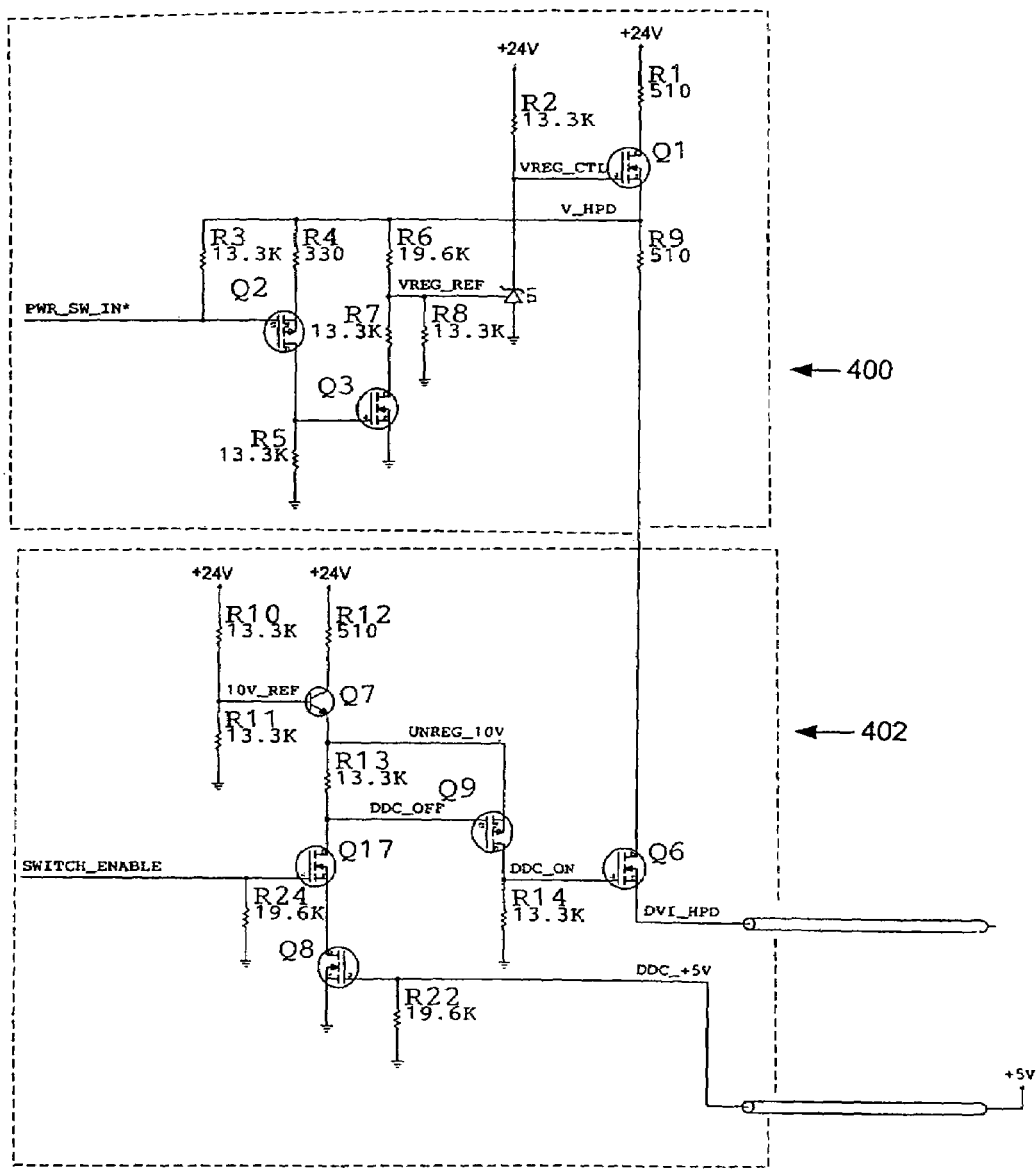
FIGS. 6(a)-6(b) are circuit diagrams of an exemplary signaling circuit according to the present invention.
Figure 6B:
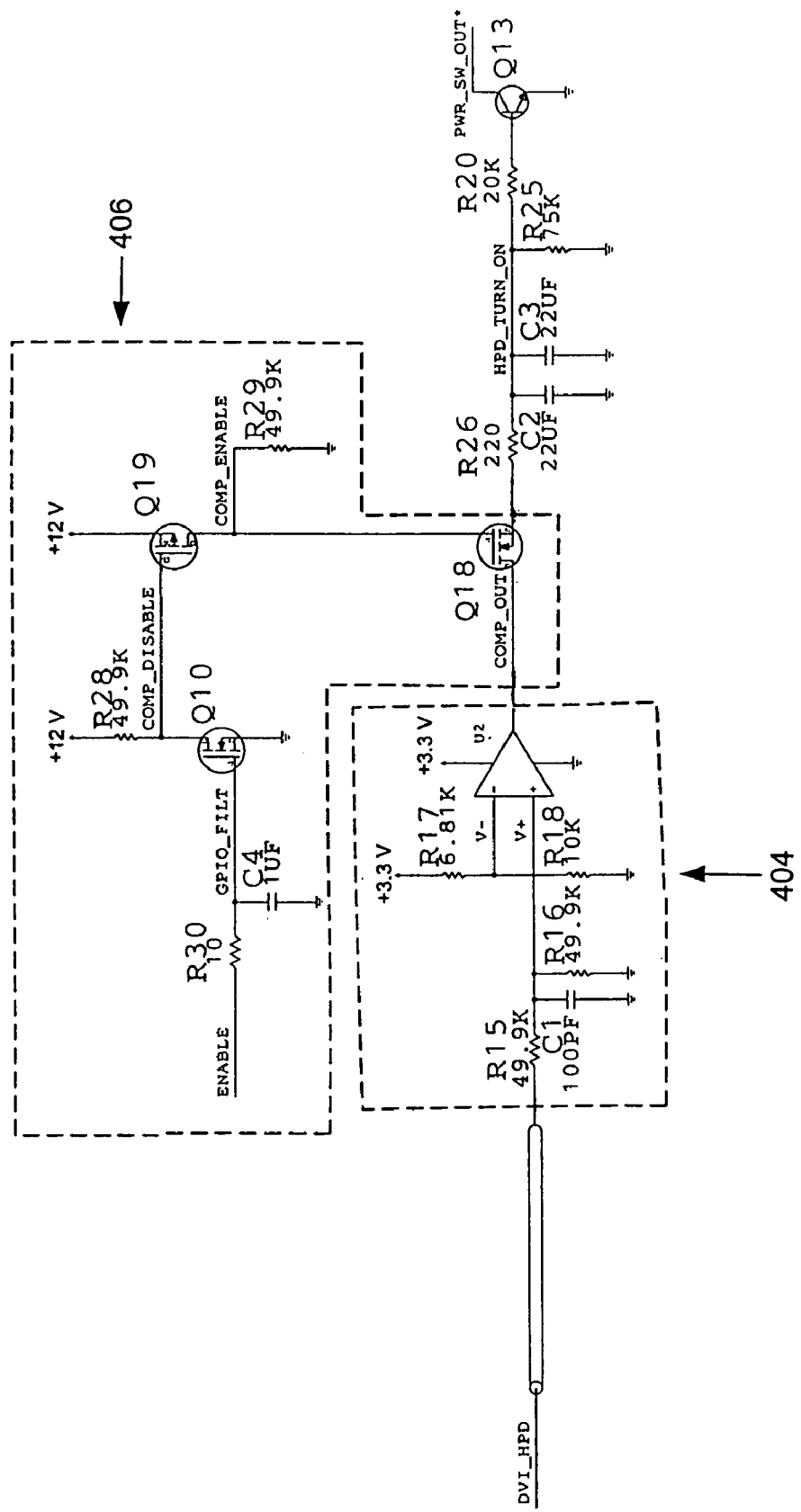

Referring now to FIGS. 6(*a*)-6(*b*), circuit diagrams of an exemplary signaling circuit according to the present invention are shown. The FIG. 6 example is presented for purposes of illustration, and in alternate embodiments, the present invention may utilize various components and component values other than those discussed in conjunction with the FIG. 6 embodiment. The operation of the exemplary signaling circuit will be described in conjunction with the timing diagram in FIG. 7.

Initially, system detect and enable 406 may determine whether secondary signal generation 400 is present in the system. If secondary signal generation 400 is present, a signal DDC_+5V and a signal DDC_ON in primary signal generation 402 may be in a high state (see FIG. 7). When DDC_ON is in a high state, transistor Q6 in primary signal generation 402 may be turned on, thereby connecting primary signal generation 402 to secondary signal generation 400. In particular, transistor Q6 connects resistor R9 to a signal V_HPD in secondary signal generation 400. In this exemplary embodiment, the V_HPD signal may be used to signal, including deactivate, first device 104.

The Digital Visual Interface (DVI) specification defines a high level output for the V_HPD signal to be within a range of 2.4 volts to 5.5 volts. This range may be subdivided in the FIG. 6 embodiment in order to signal first device 104. In particular, the V_HPD signal may have a high voltage level at or near 3 volts or 5 volts, both of which comply with the DVI specification. The voltage level of V_HPD may be controlled by the PWR_SW_IN* signal and resistors R6, R7, and R8 in secondary signal generation 400. When the system is operating in a non-signaling mode, the signal PWR_SW_IN* may be set at a high state, and the reference divider for a voltage regulator (U1 and Q1) is comprised of resistors R6 and R8. The ratio of resistors R6 and R8 may set voltage regulator U1/Q1 to regulate the V_HPD signal at or near 3 volts. But when information is to be signaled to first device 104, such as when a switch associated with the second device is depressed or asserted, the signal PWR_SW_IN* may transition to a low state (point 700 in FIG. 7) and the ratio of resistors R6, R7, and R8 may adjust the level of the V_HPD signal at or near 5 volts (point 702 in FIG. 7).

When the V_HPD signal transitions to or near 5 volts, a signal DVI_HPD may also transition from 3 volts to approximately 5 volts (point 704). The DVI_HPD signal may be transmitted to first device 104 by at least one signal line in the DVI connection. The transition of the DVI_HPD signal to approximately 5 volts may be detected by secondary signal detection 404 in first device 104. In particular, the input V+ into comparator U2 may transition to an increased voltage level, such as 2.5 volts, causing the output of comparator U2 to transition to a high state (points 706 and 708 in FIG. 7). This, in turn, may activate transistor Q13 in system detect and enable 406. When transistor Q13 is turned on, a signal PWR_SW_OUT* may transition to a low state (point 710 in FIG. 7). In this exemplary embodiment, the transition of signal PWR_SW_OUT* to a low state may initiate deactivation of first device 104.

When PWR_SW_IN* transitions back to a high state, the signals V_HPD, DVI_HPD, and V+ may transition to lower voltage states (points 712, 714, 716, and 718 in FIG. 7). In the FIG. 6 embodiment, V_HPD and DVI_HPD may transition back to approximately 3 volts, and V+ transitions to approximately 1.5 volts. In response, the signal COMP_OUT may then transition to a low state (point 720), causing the signal PWR_SW_OUT* to return to a high state (point 722 in FIG. 7). Thus, the signaling circuit in the present invention may utilize a signal output range in a manner that allows the signaling circuit to simultaneously use one or more signal lines for their predefined functions and transmit information to the first device.

Figure 8:
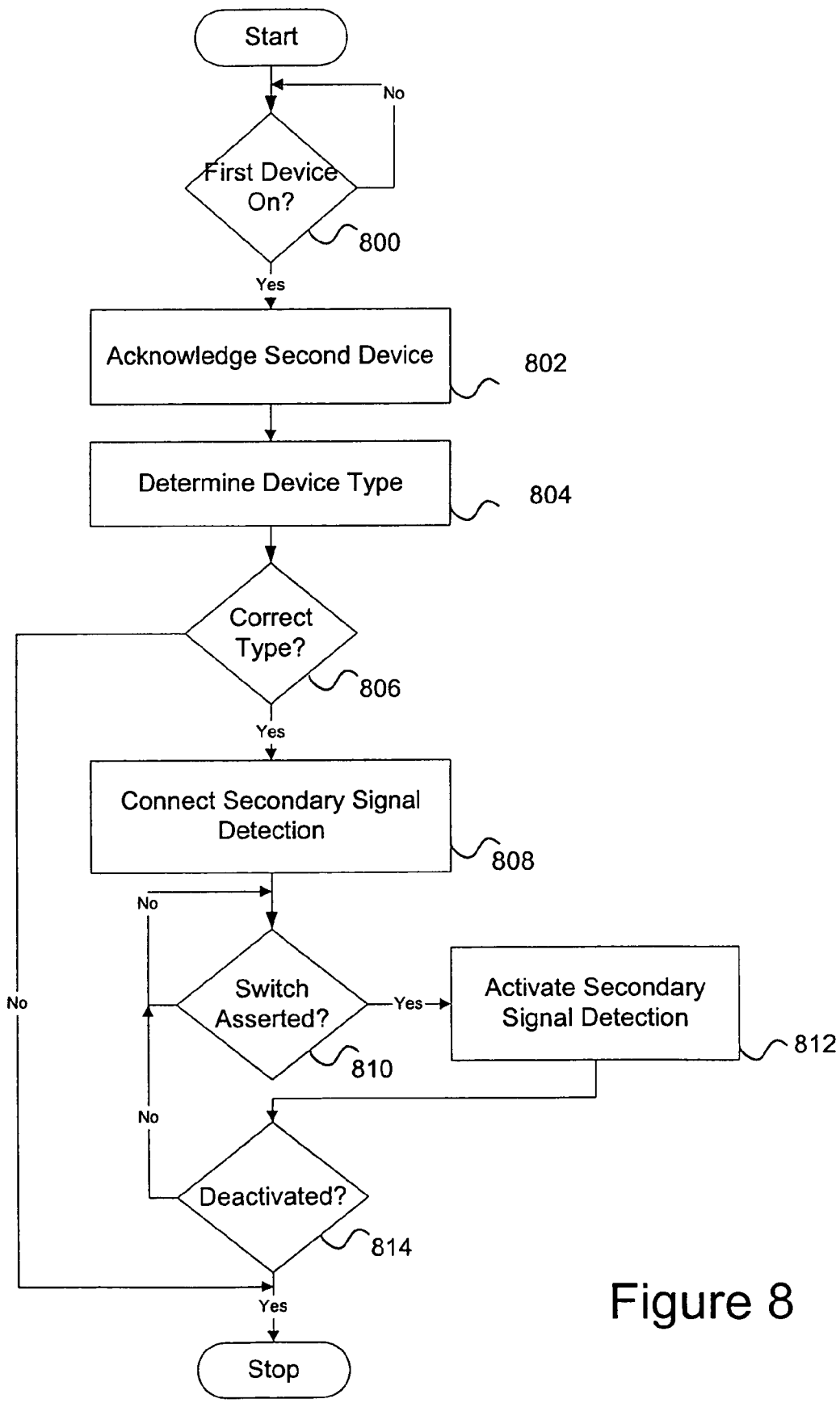
FIG. 8 is a flowchart illustrating an exemplary method for signaling a first device from a second device according to the present invention.

FIG. 8 is a flowchart illustrating an exemplary method for signaling a first device from a second device according to the present invention. The FIG. 8 example is presented for purposes of illustration, and in alternate embodiments, the present invention may utilize various steps and sequences other than those discussed in conjunction with the FIG. 8 embodiment.

Initially a determination may be made as to whether or not first device 104 is turned on or off, as shown in block 800. If first device 104 is turned on, the process may pass to blocks 802 and 804 where the presence of second device 102 may be acknowledged and the device type determined. In this exemplary embodiment, determining the device type includes the detection of secondary signal generation 400.

A determination may then be made as to whether or not the second device 104 is the correct type (block 806). If it is the correct type, the secondary signal generation 400 may be connected electronically to secondary signal detection 406, as shown in block 808. A determination may then be made as to whether or not a switch associated with the second device has been depressed or asserted. In the exemplary embodiment of FIG. 6, asserting the switch causes the PWR_SW_IN* to transition to low state and the signal V_HPD to increase from approximately 3 volts to approximately 5 volts, thereby signaling the first device 104 that the switch has been asserted.

If the switch has been asserted, the process may continue at block 812 where the secondary signal detection may be activated in order to initiate deactivation of the first device. In the FIG. 6 embodiment, the secondary signal detection may be activated by increasing the voltage level of signal V+, which causes the output of the comparator U2 to transition to a high state. When the output of comparator U2 is high, the transistor Q13 may be activated and the signal PWR_SW_OUT* may transition to a low state. This transition may initiate the deactivation of first device 104.

Next, a determination may be made as to whether or not the first device 104 has been deactivated. This step is shown in block 814. If not, the process may return to block 810 and repeat until first device 104 is deactivated. When first device 104 is deactivated, the process may end.

Thus, the present invention provides a mechanism for signaling a first device from a second device using at least one predefined signal line in a connection between the two electronic devices. While the invention has been particularly shown and described with reference to an exemplary embodiment, it will be understood by those skilled in the art that various changes in form and detail may be made therein without departing from the spirit and scope of the invention. For example, the present invention has been described with reference to deactivating the first device from the second device when a switch associated with the second device is asserted. The invention, however, is not limited to this function. The present invention may be used to signal any information along with the predefined functions of the connection. For example, the state or status of a particular device or a system may be transmitted to another device using the techniques of the present invention. Additionally, actions or functions other than asserting a switch may be used to signal information to the first device.

What is claimed is:

1. A system for signaling a first device from a second device using a connection comprised of at least one signal line having at least one predefined function, the system comprising:
   a signal generation circuit in the second device operable to generate a first signal level and a second signal level that differs from the first signal level, wherein the first signal level is within a predefined range of signal levels used for communicating at least one predefined function, and the second signal level is also within the predefined range of signal levels used for communicating the at least one predefined function as well as within a range of signal levels used for communicating information not included in the at least one predefined function; and
   a signal detection circuit connected electronically to the signal generation circuit via the at least one signal line and operable to detect the first signal level and the second signal level.

2. The system of claim 1, wherein the signal detection circuit generates a detection signal in response to detecting the second signal level.

3. The system of claim 2, further comprising a signaling circuit connected electronically to the signal detection circuit and operable to receive the detection signal and signal the first device in response to receiving the detection signal.

4. The system of claim 1, further comprising a system detector circuit in the first device operable to detect the presence of the signal generation circuit in the second device.

5. The system of claim 1, wherein the first device comprises a computing device and the second device comprises a visual display screen.

6. The system of claim 5, wherein the signal generation circuit generates the second signal level when a switch associated with the visual display screen is asserted.

7. The system of claim 1, wherein the first device comprises a computing device and the second device comprises an adapter.

8. A system for transmitting information to a first device from a second device using a connection comprised of at least one signal line having at least one predefined function, wherein the information is not included in the at least one predefined function and the at least one predefined function is communicated using a signal level within a predefined range of signal levels, the system comprising:
- a signal generation circuit in the second device operable to generate a first signal level and a second signal level that differs from the first signal level, wherein the range of signal levels used to communicate the at least one predefined function is subdivided to comprise a first signal level range and a second signal level range, and wherein the first signal level is within the first signal level range and communicates the at least one predefined function and the second signal level is within the second signal level range and communicates the information and the at least one predefined function; and
- a signal detection circuit in the first device connected electronically to the signal generation circuit via the at least one signal line and operable to detect the first signal level and the second signal level.

9. The system of claim 8, wherein the signal detection circuit generates a detection signal in response to detecting the second signal level.

10. The system of claim 8, further comprising a system detector circuit in the first device operable to detect the presence of the signal generation circuit in the second device.

11. The system of claim 8, wherein the first device comprises a computing device and the second device comprises a visual display screen.

12. The system of claim 8, wherein the first device comprises a computing device and the second device comprises an adapter.

13. A method for signaling a first device from a second device using a connection comprised of at least one signal line having at least one predefined function, the method comprising:
- generating a first signal level that is within a predefined range of signal levels used for communicating the at least one predefined function;
- generating a second signal level that is within the predefined range of signal levels used for communicating the at least one predefined function as well as within a range of signal levels used for communicating information not included in the at least one predefined function;
- detecting the first signal level when the first signal level is generated; and
- detecting the second signal level when the second signal level is generated.

14. The method of claim 13, further comprising generating a detection signal after detecting the second signal level.

15. The method of claim 14, further comprising:
receiving the detection signal; and
signaling the first device after receiving the detection signal.

16. The method of claim 15, wherein signaling the first device comprises deactivating the first device.

* * * * *